July 13, 1937.  H. CROSS  2,086,996
X-RAY MOUNT
Filed Jan. 30, 1937
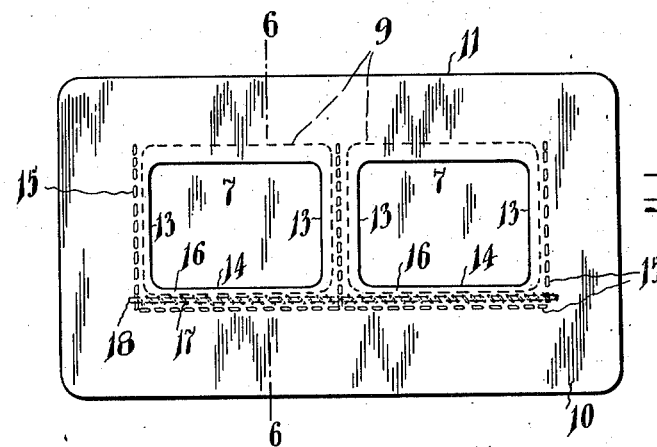
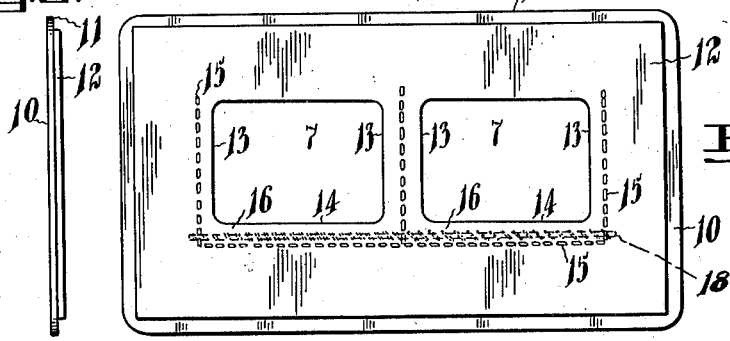
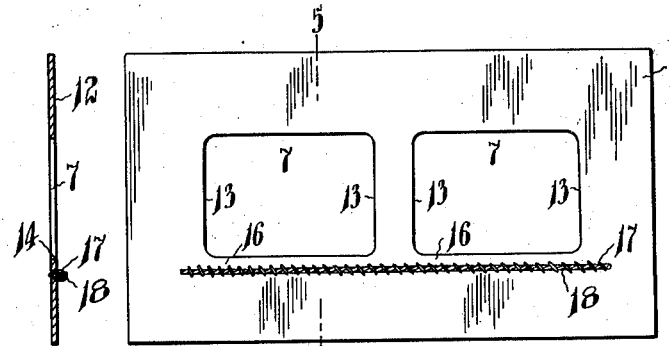
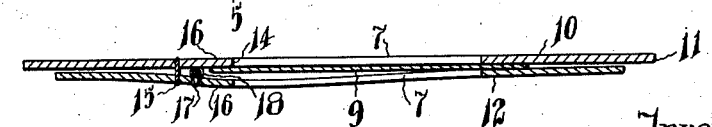
Inventor
Henry Cross
By Frederick C. Bromley
Atty.

Patented July 13, 1937

2,086,996

UNITED STATES PATENT OFFICE 2,086,996

X-RAY MOUNT

Henry Cross, Toronto, Ontario, Canada

Application January 30, 1937, Serial No. 123,142
In Canada February 15, 1936

4 Claims. (Cl. 40—159)

The invention appertains to mounts commonly employed in dental practice for holding X-ray films which are visible through windows in the mounts.

The invention comprehends an improved mount that not only retains the film flat but also enables a clear and unobstructed vision to be had of it through the window of the mount.

A distinctive feature of the invention resides in its structure whereby the likelihood of scratching the film is obviated. It is easily inserted in and removed from the mount and is so securely held therein that it cannot drop out in ordinary handling of the mount.

The invention consists essentially of a mount composed of two superimposed sheets of pasteboard perforated to provide one or more windows and sewn together with thread, the sewing being effected on lines parallel to and in proximity of edges of the perforation so as to define a pocket or pockets receptive to the film. In forming a pocket the two plies of material are sewn at the opposing side edges of the apertured part and also at the bottom edge thereof. The top edge is however left unsewn in order to provide for insertion of the film into the pocket thus formed.

A distinctive feature of the invention resides in the provision of means for spacing the edges of the bottom of each aperture to readily admit the lower edge of the film. The means consists of an element located between and in advance of the line of sewing at the bottom edge so as to spread the edges of the complemental sheets at the bottom of said aperture. The element preferably comprises a coarse thread forming a part of a line of sewing through the rear sheet of pasteboard.

The accompanying drawing is illustrative of a practical application of the invention, in which Figure 1 is a front elevation of a mount containing two windows.

Figure 2 is a rear view thereof.

Figure 3 is an edge view of Figure 2.

Figure 4 is an elevation of the rear sheet of pasteboard showing the line of stitching on its inner face that spaces the lower edges of the apertured portion of the mount to admit the bottom edge of the film.

Figure 5 is a vertical sectional view of Figure 4 taken on line 5—5 thereof.

Figure 6 is an enlarged vertical section of Figure 1 taken on line 6—6 thereof.

Like numerals of reference indicate corresponding parts in each of the figures throughout the drawing of the invention.

In performing the invention, two sheets of cardboard are utilized in which one or more registering openings are cut as at 7 to compose a window or windows through which mounted film may be viewed. The windows are of the usual rectangular shape, the number and their arrangement varying according to requirements. Each window is of a slightly smaller size than the film to be contained therein in order that the margin of the film may be held between the two plies or thicknesses of cardboard. The film is denoted at 9.

The sheets are placed in superimposed relation as shown, and the front sheet 10 preferably has its top edge 11 protruding slightly above that of the rear sheet 12 so as to facilitate insertion of film therebetween.

The sheets are sewn together as at 15, with ordinary thread at a slight distance from the side and the bottom edges 13 and 14 respectively of each opening or aperture. The stitching defines a pocket for each aperture receptive to a film that is inserted from between the top edges of the attached sheets.

The means for spreading the companion bottom edge-portions 16 of any aperture is accomplished by a line of stitching 17 along the rear sheet only, utilizing a very coarse thread 18 in the shuttle of the sewing machine. This coarse thread is in the nature of a cord which in the sewing operation is attached to and lies against the inner face of the rear sheet in advance of stitching 15 of the bottom edge 14.

In the manufacturing of the mount, the line of stitching 17 is first applied to the rear sheet 12 so that when the two sheets are subsequently sewn together by the pocket-forming stitching 15, the bottom edge portions 16 of an aperture will be spread by the interposition of the cord. This provides for the ready insertion of the bottom edge of the film. It is apparent that other means might be resorted to for this purpose without departing from the spirit and scope of the invention.

What I claim is:—

1. An X-ray mount composed of companion sheets of pasteboard having registering apertures forming a window for a film, means contiguously attaching the sheets on lines adjacent to the bottom and the side edges of the apertures to provide a pocket for the film, a coarse thread interposed between the bottom edges of the apertures to hold them in spaced relation for readily admitting the lower edge of the film and securing means for said thread.

2. An X-ray mount composed of complemental sheets of pasteboard having apertures forming a window for a film, lines of thread stitching attaching the sheets adjacent to the bottom and the side edges of the apertures so as to provide a pocket receptive to the film, and a line of stitching through one of the sheets including a coarse thread on the inner side thereof, this line of stitching being disposed in advance and alongside of the aforesaid stitching at the bottom edges of the apertures so as to space these edge portions to readily admit the lower edge of the film therebetween.

3. In an X-ray mount composed of two-ply material having a window-forming aperture therein and a pocket formed by attaching the two plies of material in the vicinity of the bottom edges and the side edges of the aperture so as to leave an opening for insertion of a film, the structure being characterized by means constructed and arranged to retain said bottom edges of the two ply material in spaced relation to readily admit the bottom edge of the film, said means consisting of a cord applied by sewing to the inner face of one of the two plies of said material slightly in advance of its attachment to the other ply of material.

4. An X-ray mount composed of a pair of superimposed sheets of pliant material having registering apertures forming a window for a film, means attaching said sheets adjacent to edges of the apertures to provide a pocket for the film, and means for spreading edges of the sheets in advance of the attaching means to readily admit the edge of the film, the means for spreading the edges consisting of a line of stitching through one of the sheets including a coarse thread on the inner side thereof running parallel to but spaced from the extremity of the adjacent edge of the aperture.

HENRY CROSS.